United States Patent [19]

Hage et al.

[11] 4,392,526
[45] Jul. 12, 1983

[54] CONCENTRIC TUBE HEAT EXCHANGER WITH SPACER

[75] Inventors: Manfred Hage, Ulm-Wiblingen; Hans Demuth, Vöhringen; Otto Junker, Gerlenhofen, all of Fed. Rep. of Germany

[73] Assignee: Wieland Werke AG, Ulm, Fed. Rep. of Germany

[21] Appl. No.: 257,085

[22] Filed: Apr. 24, 1981

[30] Foreign Application Priority Data

May 8, 1980 [DE] Fed. Rep. of Germany ....... 3017574

[51] Int. Cl.³ ............................................. F28D 7/10
[52] U.S. Cl. .................................................. 165/154
[58] Field of Search ............... 165/154, 172, 155, 143; 138/113, 114

[56] References Cited

U.S. PATENT DOCUMENTS

| | | | |
|---|---|---|---|
| 1,704,097 | 3/1929 | Mahleisen | 165/172 |
| 2,166,808 | 7/1939 | Flindt | 165/67 X |
| 2,241,209 | 5/1941 | Lea | 165/172 X |
| 2,272,428 | 7/1942 | Pedersen | . |
| 3,036,818 | 5/1962 | Legrand | 165/154 |
| 3,105,708 | 10/1963 | Esty | 165/154 X |
| 3,670,811 | 6/1972 | Christensen | 165/178 X |
| 3,791,416 | 2/1974 | Ziemek et al. | 138/114 X |
| 3,802,491 | 4/1974 | Plank, Jr. et al. | 165/154 X |
| 3,934,645 | 1/1976 | Butts | 165/172 X |
| 3,976,129 | 8/1976 | Silver | 165/154 |
| 4,086,959 | 5/1978 | Habdas | 165/155 |
| 4,250,927 | 2/1981 | Newburg | 138/113 |

FOREIGN PATENT DOCUMENTS

| | | |
|---|---|---|
| 1702672 | 4/1955 | Fed. Rep. of Germany . |
| 7206743 | 6/1976 | Fed. Rep. of Germany . |
| 1316110 | 5/1973 | United Kingdom ................ 138/113 |

*Primary Examiner*—Sheldon J. Richter
*Attorney, Agent, or Firm*—Ladas & Parry

[57] ABSTRACT

A heat exchanger for transferring heat from liquids or gases has an outer tube spaced from an concentric finned inner tube by a plurality of spacers. The spacers each have a tubular sleeve which engages the fins of the inner tube and a portion of the sleeve engages in the groove between adjacent fin turns of the inner tube. The outer surface of the spacer engages the internal surface of the outer tube. The spacer is preferably made of plastics material and the inner finned tube has fins formed in a threaded fashion. A preferred embodiment of the heat exchanger has a longitudinally slotted sleeve and the adjacent edges of the slot are formed to provide a snap-in engagement.

10 Claims, 13 Drawing Figures

CONCENTRIC TUBE HEAT EXCHANGER WITH SPACER

This invention relates to a heat exchanger for transferring heat from liquids or gases.

It is known to provide an outer tube and at least one concentric inner tube, there being provided between each pair of tubes spacers which each comprise at least three circumferentially equi-spaced radial supporting elements made of a softer-material than the walls of the tubes. The spacers are provided with supporting elements so as to prevent the tubes from rattling and rubbing together. It is for this reason that the supporting elements are made of a softer material than that of the walls of the tubes and it has been suggested that plastics material be used for the supporting elements since plastics has only a minor effect on the heat transference properties of the exchanger and, moreover, is resistant to the liquids or gases used.

Thus, for example, the spacers according to German Offenlegungsschrift No. 1,675,323 consist of three supporting elements which are maintained in their spatial arrangement by one or a plurality of rings concentric with the tubes. A disadvantage with these spacers is, in particular, that the supporting elements can move out of place towards one another and the distance pieces themselves are not retained in the axial direction. To overcome the problem of displacement of the supporting elements German Utility Model 1702672 discloses a heat exchanger in which the core tube is formed of a smooth tube and in order to secure the spacers against axial displacement, the spacers are soldered to the core tube.

The object of the present invention is to provide a heat exchanger in which the spacers can be simply manufactured and easily fitted so that they are secured in both the peripheral and axial directions.

According to this invention there is provided a heat exchanger for transferring heat from liquids or gases comprising an outer tube spaced from at least one substantially concentric finned inner tube by spacers, each spacer having a tubular sleeve which bears against the finned outer surface of the inner tube and at least three circumferentially, substantially equi-spaced, radial elements supporting the outer tube inner wall, said tubular sleeve having at least one retaining member engaging in the groove between adjacent turns.

In a preferred embodiment the retaining member is in a form of at least one resilient retaining lug. Usually the fins are in the form of an external thread on the inner tube and so the tubular sleeve preferably has an internal thread conforming to said fins. The internal thread may consist of one thread turn which can be broken.

To facilitate manufacture of spacers in the form of a simple moulded part, it is convenient to make them from an extruded section, for example, made of plastics material but aluminium may also be used.

When the spacers are made of plastics material the tubular sleeve is preferably provided with a longitudinal slot and conveniently adjacent longitudinal edges of the slot are arranged for snap-in engagement.

A further preferred embodiment utilises a plastics spacer which is formed in two parts and which is connected by supporting elements that are curved towards the outer tube.

Embodiments of the heat exchanger may be rolled to form a spiral, coil or helix and particularly where the exchanger is in the shape of a helix a flat oval shape is formed.

The invention will now be described by way of example with reference to the accompanying drawings in which.

Figure 1:
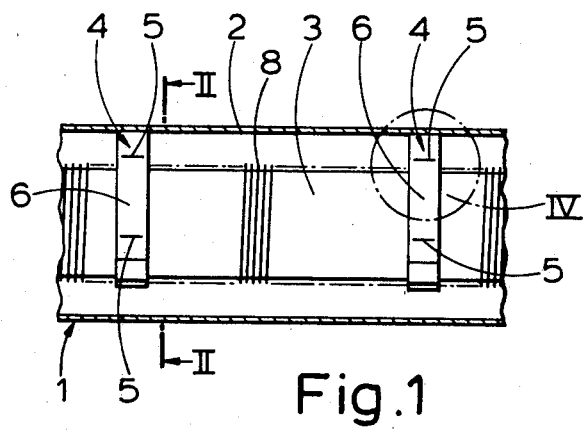
FIG. 1 shows a longitudinal cross-section of a heat exchanger in accordance with one embodiment of this invention having slotted spacers with resilient retaining lugs.
Figure 2:
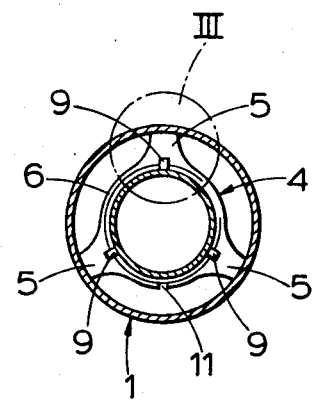
FIG. 2 shows a cross-section along broken double arrow headed lines II—II of FIG. 1.
Figure 3:
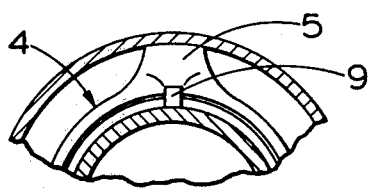
FIG. 3 shows a detail encircled III in FIG. 2 to an enlarged scale.
Figure 4:
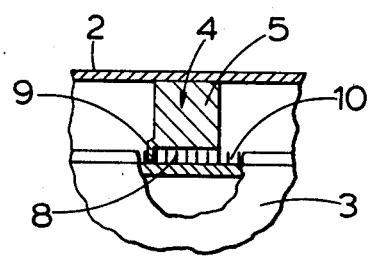
Figure 5:
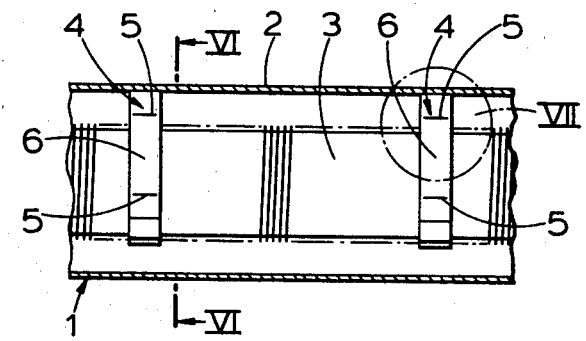
Figure 6:
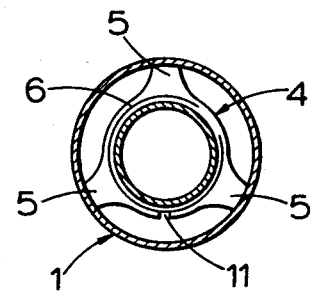
Figure 7:
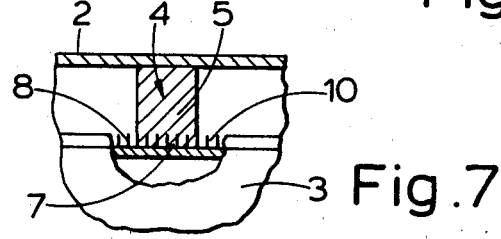
Figure 8:
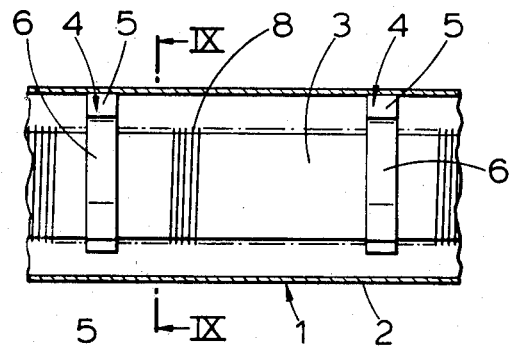
Figure 9:
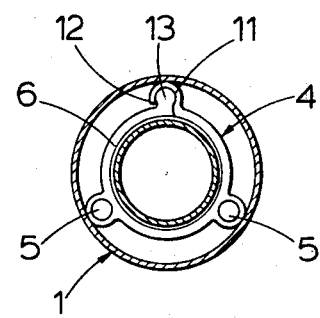
Figure 10:
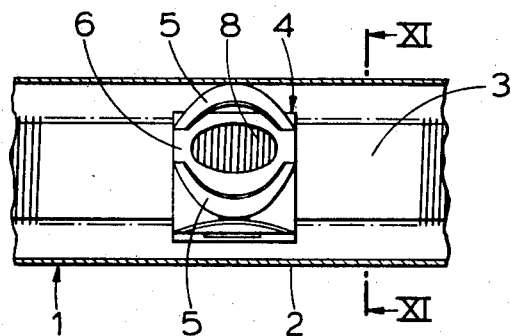
Figure 11:
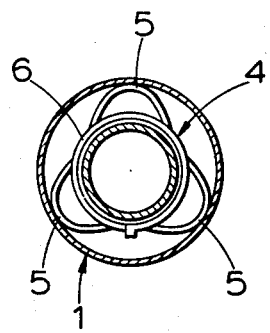
Figure 12:
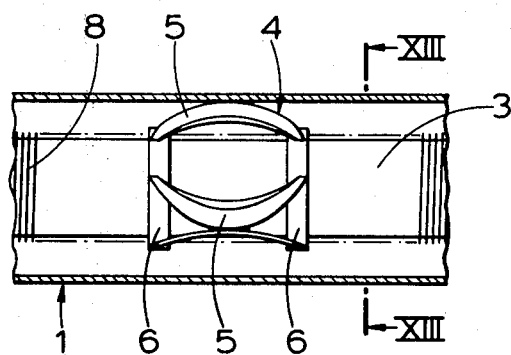
Figure 13:
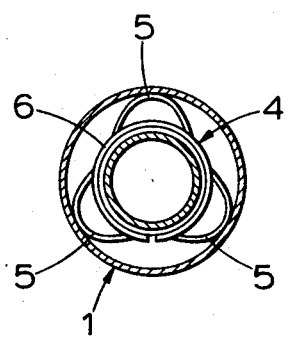

FIG. 4 shows a detail of the region encircled IV in FIG. 1 to an enlarged scale, FIG. 5 shows a further embodiment in accordance with this invention in longitudinal cross-section with the spacer being internally threaded and longitudinally slotted, FIG. 6 shows a cross-section along double arrow headed lines VI—VI of FIG. 5, FIG. 7 shows an enlarged view of the portion encircled VII in FIG. 5, FIG. 8 shows another embodiment of the invention in longitudinal cross-section with a longitudinal slotted spacer, FIG. 9 shows a cross-section along double arrow headed lines IX—IX of FIG. 8, FIG. 10 shows yet a further heat exchanger in accordance with the invention having a spacer provided with curved supporting elements, in longitudinal cross-section, FIG. 11 shows a section along double arrow headed lines XI—XI of FIG. 10, FIG. 12, shows yet another heat exchanger in accordance with this invention having a two piece plastics tubular sleeve, in longitudinal cross-section, and FIG. 13 shows a cross-section along double arrow headed lines XIII—XIII of FIG. 12.

In the drawings like reference numerals denote like parts.

In the figures the heat exchanger 1 has an outer tube 2 spaced from a substantially, concentric finned inner tube 3 by spacers 4 made of plastics material. Although only one inner tube is shown it is to be understood that more than one inner tube may be employed. Each of the spacers 4 has a tubular sleeve 6 which bears against the finned outer surface of the inner tube and three circumferentially, equi-spaced, radial elements 5 supporting the outer tube inner wall. The number of spacers 4 is determined by the design requirements of the heat exchanger and the tubes are usually rolled to form a spiral, coil or helix and when the tubes are formed into a helix, the helix preferably has a flat oval shape. The fins 8 on the outer surface of the inner tube 3 conveniently have a threaded form and referring particularly to FIGS. 1–4 resilient retaining lugs 9 are distributed over the inner circumference of the sleeve 6 and engage in a groove 10 between adjacent fin turns 8. The spacers 4 are provided with a longitudinal slot 11 to facilitate fitting of the spacers around the inner finned tube and the retaining lugs are then, as stated previously, arranged around the sleeve. If, the spacers 4 are screwed on to the inner tube 3 then only one retaining lug 9 is required.

Referring now to FIGS. 5–7, the plastics sleeve 6 has, for axial locking, a continuous thread 7 which conforms to the fins 8. The internal thread 7 consists of one thread turn although it may be a broken thread turn.

The heat exchanger shown in FIGS. 8 and 9 again has a longitudinal slotted sleeve 6 but the longitudinal edges 12, 13 are arranged for snap-in engagement which also serves as one of the supporting elements.

The embodiment shown in FIGS. 10, 11 has spacers 4 that are provided with supporting elements 5 having a form which curves toward the outer tube 2. The spacer 4 is preferably injection moulded and may have either an internal thread 7 or retaining lugs 9. In the embodiment of FIGS. 12, 13, which is a modification of the FIG. 4 embodiment, the spacer has a slotted plastic sleeve 6 formed in two parts.

When the heat exchanger of the present invention is used as a coaxial condenser water, for example, flows through the inner tube 3 whilst the refrigerating agent is provided in the annular space between the outer tube 2 and the inner tube 3.

We claim:

1. A heat exchanger comprising an outer tube, at least one substantially concentric inner tube having an outer surface, a fin radially extending from the outer surface of the inner tube and having a height less than the distance between the inner and outer tubes, said fin being formed around the inner tube and extending therealong in turns, spacers being provided between each of the tubes, each spacer having a tubular sleeve which bears against the outer surface fin of the inner tube and at least three circumferentially, substantially equi-spaced, radial supporting elements supporting the outer tube inner wall, said tubular sleeve having at least one retaining member engaging in the groove between adjacent fin turns.

2. A heat exchanger according to claim 1, wherein said retaining member is in the form of at least one resilient retaining lug.

3. A heat exchanger according to claim 1, wherein the fin turns are in the form of an external thread on the inner tube and the tubular sleeve has an internal thread conforming to said fin turns.

4. A heat exchanger according to claim 3, wherein the internal thread consists of one thread turn.

5. A heat exchanger according to claim 4, wherein the internal thread consists of a broken thread turn.

6. A heat exchanger according to claim 3, wherein the spacer is in the form of extruded section.

7. A heat exchanger according to claim 1, wherein the spacer is made of plastics material.

8. A heat exchanger according to claim 7, wherein the tubular sleeve is provided with a longitudinal slot.

9. A heat exchanger according to claim 8, wherein adjacent longitudinal edges of the slot are arranged for snap-in engagement.

10. A heat exchanger according to claim 7, wherein the spacer is in two parts and is connected via supporting elements which are curved toward the outer tube.

* * * * *